US006107933A

United States Patent [19]

Endo

[11] Patent Number: 6,107,933

[45] Date of Patent: Aug. 22, 2000

[54] SECURITY SYSTEM FOR VEHICLE NAVIGATION SYSTEM AND METHOD OF DETECTING IDENTIFICATION CODE

[75] Inventor: Fumihito Endo, Fukushima, Japan

[73] Assignee: Alpine Electronics, Inc., Tokyo, Japan

[21] Appl. No.: 08/968,148

[22] Filed: Nov. 12, 1997

[30] Foreign Application Priority Data

Dec. 5, 1996 [JP] Japan .................................... 8-340508

[51] Int. Cl.$^7$ .............................. G06F 7/04; G07D 7/00; G08B 5/22

[52] U.S. Cl. ............................... 340/825.31; 340/825.32; 340/825.34; 340/825.49

[58] Field of Search ......................... 340/825.31, 825.32, 340/825.49, 426, 825.34; 701/213, 49, 45; 342/457, 357, 352; 455/13.2, 13.4, 38.3, 343

[56] References Cited

U.S. PATENT DOCUMENTS

| | | | |
|---|---|---|---|
| 4,494,114 | 1/1985 | Kaish | 340/825.31 |
| 4,808,981 | 2/1989 | Seibold | 340/568 |
| 5,222,245 | 6/1993 | Ando et al. | 455/13.2 |
| 5,223,844 | 6/1993 | Mansell et al. | 342/357 |
| 5,440,313 | 8/1995 | Osterdock et al. | 342/352 |
| 5,796,365 | 8/1998 | Lewis | 342/357 |
| 5,818,345 | 10/1998 | Sjooquist | 340/825.31 |
| 5,870,018 | 2/1999 | Person et al. | 340/426 |
| 5,939,975 | 8/1999 | Tsuria et al. | 340/426 |

*Primary Examiner*—Michael Horabik
*Assistant Examiner*—M. Phan
*Attorney, Agent, or Firm*—Brinks Hofer Gilson & Lione

[57] ABSTRACT

A vehicle navigation system with a security feature capable of detecting that the system has been removed from the vehicle, which uses only one memory for storing an anti-theft code. The navigation system is provided with a GPS receiver containing a clock outputting a time synchronized with present GPS time information, while receiving electric power from the vehicle battery, and returns the time to an initial preset time when not receiving power from the battery, and detects a present position of the vehicle by means of the present GPS time and position information. A CPU detects whether or not the time of the clock has returned to the initial time, an SRAM stores a preset identification code, and a controller requests input of an identification code when the CPU detects that the time of the clock has returned to the initial time, and compares the input identification code to the identification code stored in the SRAM, and operates in accordance with the result of the comparison.

17 Claims, 5 Drawing Sheets

SECURITY SYSTEM FOR VEHICLE NAVIGATION SYSTEM AND METHOD OF DETECTING IDENTIFICATION CODE

BACKGROUND OF THE INVENTION

1. Field of the Invention

The present invention relates to a navigation system, and specifically to a vehicle navigation system having an anti-theft feature.

2. Description of the Related Art

A vehicle (e.g. automobile) navigation system provides to the driver location information so that the driver can easily understand the vehicle's current location. Generally such a navigation system has the following functions: reading out map data from a map stored on e.g. a CD-ROM or an IC memory card; displaying on a display unit a map image surrounding the location of the vehicle on the basis of the map data; displaying a superimposed location mark of the vehicle on the displayed image; scrolling the map image in accordance with movement of the vehicle; and moving the location mark of the vehicle while fixing the map image on the display.

Some vehicle navigation systems have an anti-theft code input function that prevents normal operation of the system unless a specific identification code is first input. This security measure is in case the system is removed from the car, e.g. by a thief.

FIG. 4 is a block diagram of such a conventional vehicle navigation system. A controller 10 is e.g. a microcomputer, and a GPS (Global Positioning System) receiver 1 detects a present position and speed of the vehicle by means of GPS satellite navigation. A CD-ROM drive 2 ("CD-ROM") has a CD-ROM that stores the map data. There is a display unit 3, and controller 10 controls the display unit 3 to display a map at a present position of the vehicle, a guidance route from a departure point to a destination, and a location mark of the vehicle.

A gyro 4 (gyro-compass) detects a turning angle of the vehicle, and a speed pulse detector 5 detects a speed pulse that is generated in accordance with movement of the vehicle. The controller 10 employs data obtained from the GPS receiver 1, gyro 4, and speed pulse detector 5, and map data from the CD-ROM 2 to detect a present position of the vehicle, its traveling direction, and speed.

A user operation panel 6 operates the navigation system; SRAMS (static random access memories) 7 and 8 store an anti-theft code, and there is a vehicle battery 11.

This system is supplied with electric power from the battery 11. The SRAM 7 loses any stored data when the system is disconnected from the battery 11. A backup battery 9 provides backup power to back up the data stored in the SRAM 8. Since the SRAM 8 is powered by both battery 9 and battery 11, the stored data in the SRAM 8 are maintained even if the system is disconnected from battery 11.

FIG. 5 is a flow chart showing operation of a security function in such a conventional vehicle navigation system. First, when the power switch of the system is switched ON, the controller 10 reads out data stored in the SRAMs 7, 8 at step S1. Next, the controller 10 compares an anti-theft code stored in the SRAM 7 to an anti-theft code stored in the SRAM 8. If the anti-theft code in the SRAM 7 matches the anti-theft code in the SRAM 8, the operation at step S3 brings the security function to a normal end. Thereafter, the system operates normally, namely, detecting a vehicle position based on the GPS signals, searching for a guidance route to a destination, and guiding the vehicle to the destination along the guidance route.

When the vehicle is under maintenance, for instance, the navigation system is disconnected from the battery 11. In such a case, the SRAM 8 is powered by the battery 9, and the SRAM 8 holds its data. However, the anti-theft code stored in the SRAM 7 is lost, and the anti-theft codes read out from the SRAM 7, 8 thereafter will not match at step S2.

In that case, operation moves to step S4 to accept a new anti-theft code input from the operation panel 6. After the new anti-theft code is input, operation moves to step S5 and the controller 10 compares the anti-theft code input from the operation panel 6 to the anti-theft code read out from the SRAM 8. If these anti-theft codes match, operation moves to step S3 to normally terminate the security function.

On the other hand, if the anti-theft code input via the operation panel 6 does not match the anti-theft code read out from the SRAM 8, operation moves to step S6 to normally terminate the security function, and the system halts its operation thereafter.

In this manner, the anti-theft code is stored both in the SRAM 7 powered by the battery 11 and in the SRAM 8 powered by both the battery 11 and battery 9. Accordingly, the two anti-theft codes stored in both SRAMs will not match after the system is removed from the vehicle, because then the anti-theft code stored in the SRAM 7 is lost. By utilizing the non-coincidence of the data stored in both the SRAMs 7, 8, the conventional navigation system detects that it has been disconnected from the battery 11 (e.g., stolen from the vehicle).

However, such a conventional navigation system requires two SRAMs 7, 8 dedicated to this purpose of detecting theft, which increases the cost and size of the system.

SUMMARY

The present invention is directed to a vehicle navigation system having only one memory for storing an anti-theft code and that detects whether or not the system has been disconnected from the vehicle battery.

The present vehicle navigation system includes: a GPS (or other type of navigational) receiver containing a clock outputting a time synchronized to time information received from e.g. GPS satellites, while the GPS receiver receives power from the vehicle battery, and which returns the clock time to a specific time when the GPS receiver does not receive power from the battery, and which detects a present position of the vehicle by means of the GPS signal time and position information. The system detects whether or not the time of the clock in the GPS receiver has returned to the specific time, and has a nonvolatile identification code memory for storing a preset identification code, and a controller for requesting input of an identification code upon detection that the time of the clock has returned to the specific time. The system compares the input identification code to the identification code stored in the identification code memory, and executes further processing steps in accordance with the result of the comparison.

The nonvolatile identification memory is e.g. an SRAM or EEPROM powered by a battery such that the memory holds stored data, even if the memory is not connected to the vehicle battery.

Generally in a vehicle navigation system, it is necessary to know the present time in order to detect the position of the vehicle, and a clock is therefore conventionally part of the GPS receiver. This clock updates the time as long as the GPS receiver is powered by the vehicle battery; however, the clock returns its time to an initial (preset) time when the GPS receiver is disconnected from the vehicle battery. When the GPS receiver is reconnected to the vehicle battery, the clock adjusts the time to the present received GPS time information. In the present invention, utilizing the clock incorporated in the GPS receiver, the vehicle navigation system detects whether it has been disconnected from the vehicle battery or not.

In accordance with the invention, when the navigation system is disconnected from the vehicle battery and thereby the power supply is stopped and then later resumed (e.g., upon the system being stolen and then put back into unauthorized use), a detection element detects whether or not the time of the clock has returned to the initial time. This can be achieved in such a manner that the detection element compares a time output from the clock to an initial time stored in the initial time memory, or monitors the variation of the time output from the clock to check whether the compared time has substantially varied or not (for example, variation of a year, a month, or a day).

When the detection element detects that the time of the clock has returned to the initial time, the control element requests input of an identification code. When the identification code is input, the control element compares the input identification code to an identification code stored in the identification code memory. When the input identification code does not match the identification code stored in the identification code memory, the control element brings the security function to an abnormal termination (state) where the system operation remains frozen, bringing the vehicle navigation system into a malfunction state. Thereby, anyone (except the authorized owner) cannot use the vehicle navigation system.

Further, the present navigation system detects whether or not it has been disconnected from the vehicle battery by detecting whether or not the time of the clock in the GPS receiver has returned to the initial time. This reduces the number of SRAMS compared to a conventional vehicle navigation system. Thereby, the present navigation system of the invention has reduced cost and size.

DETAILED DESCRIPTION

Embodiments of the present invention are hereafter described in detail, with reference to the accompanying drawings.

Figure 1:
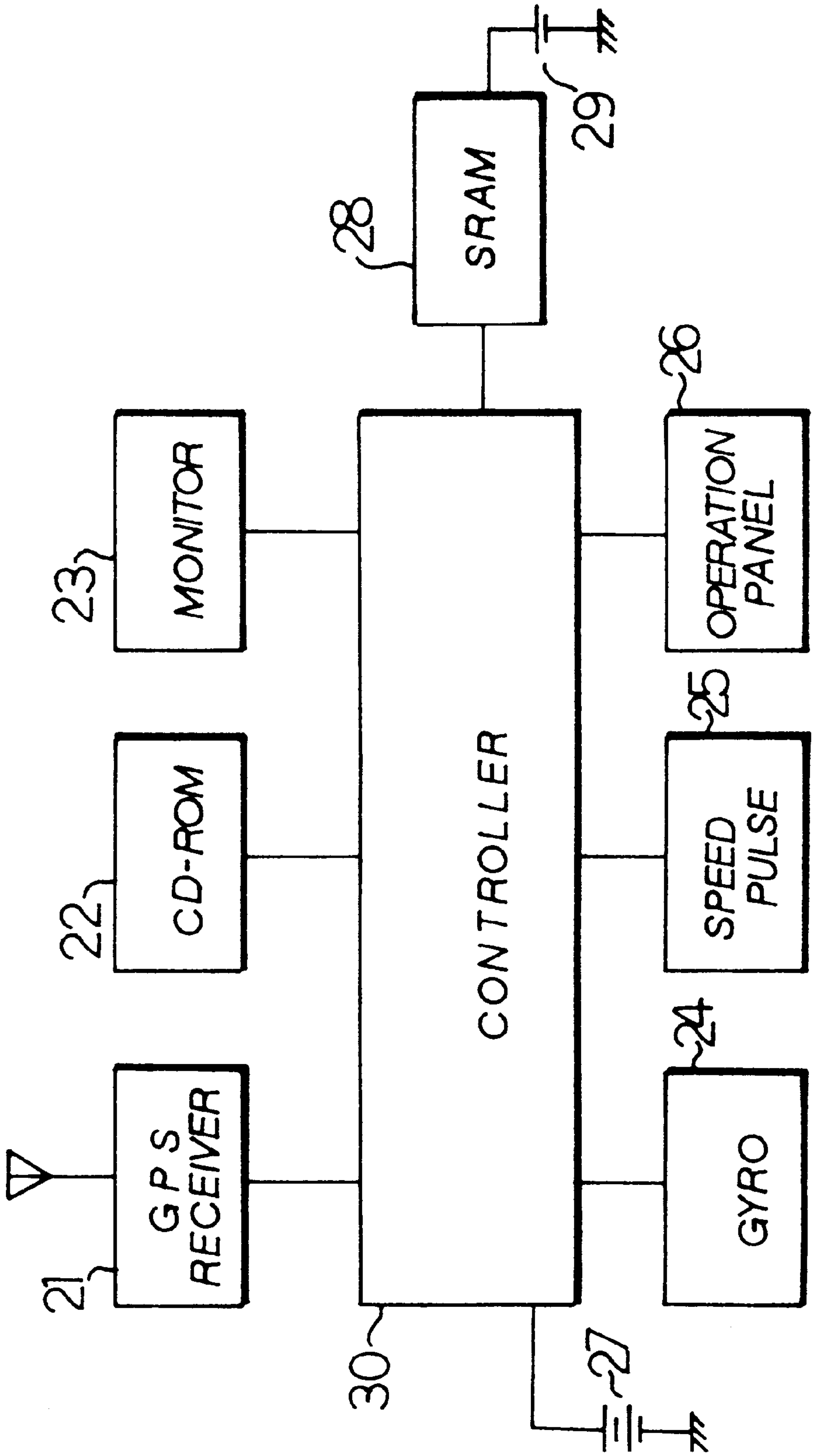
FIG. 1 is a block diagram showing a vehicle navigation system provided with an anti-theft code input function in accordance with the invention.
Figure 4:
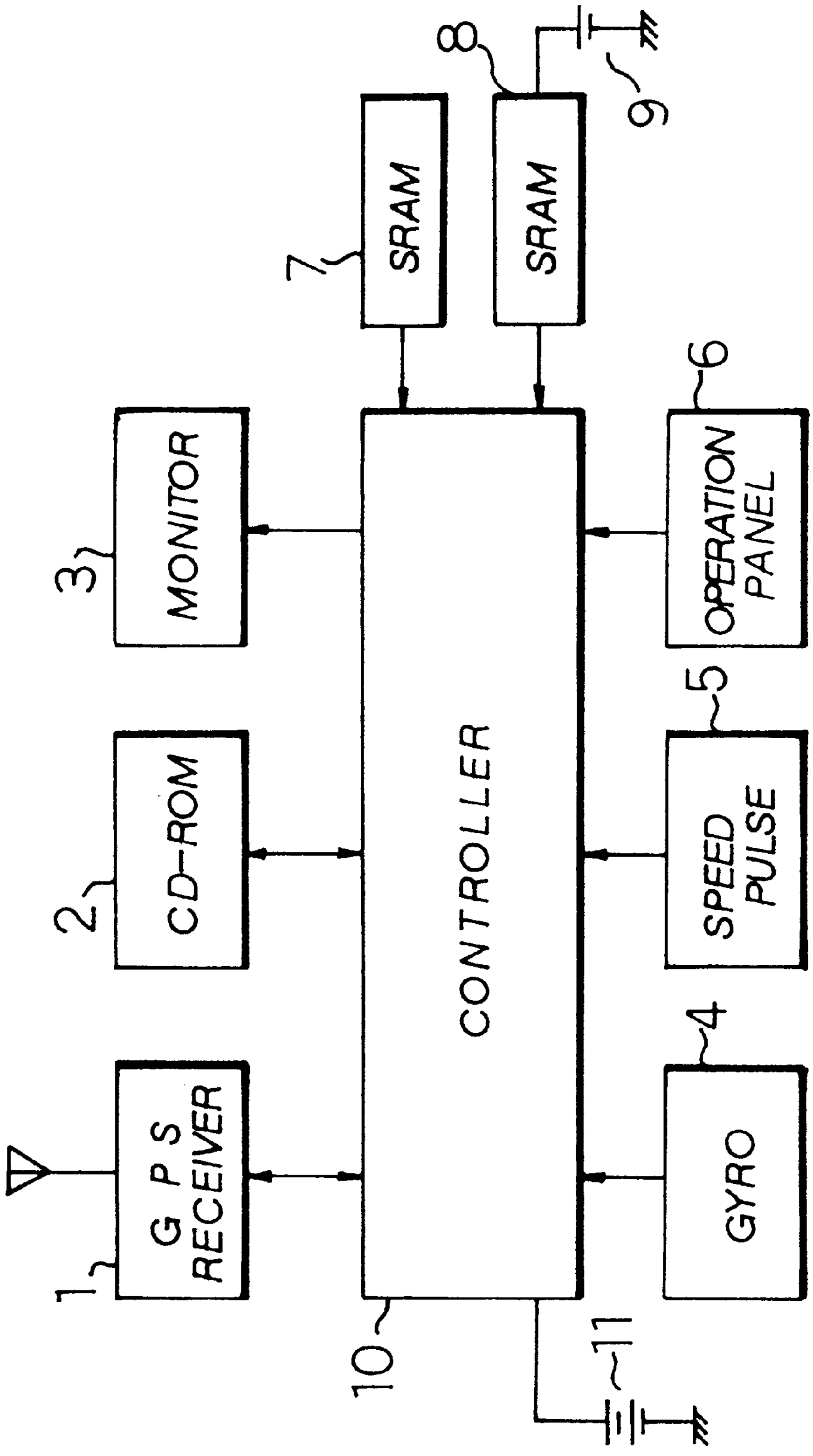
Fig. 4 PRIOR ART
FIG. 4 is a block diagram of a conventional vehicle navigation system provided with an anti-theft code input function.
Figure 5:
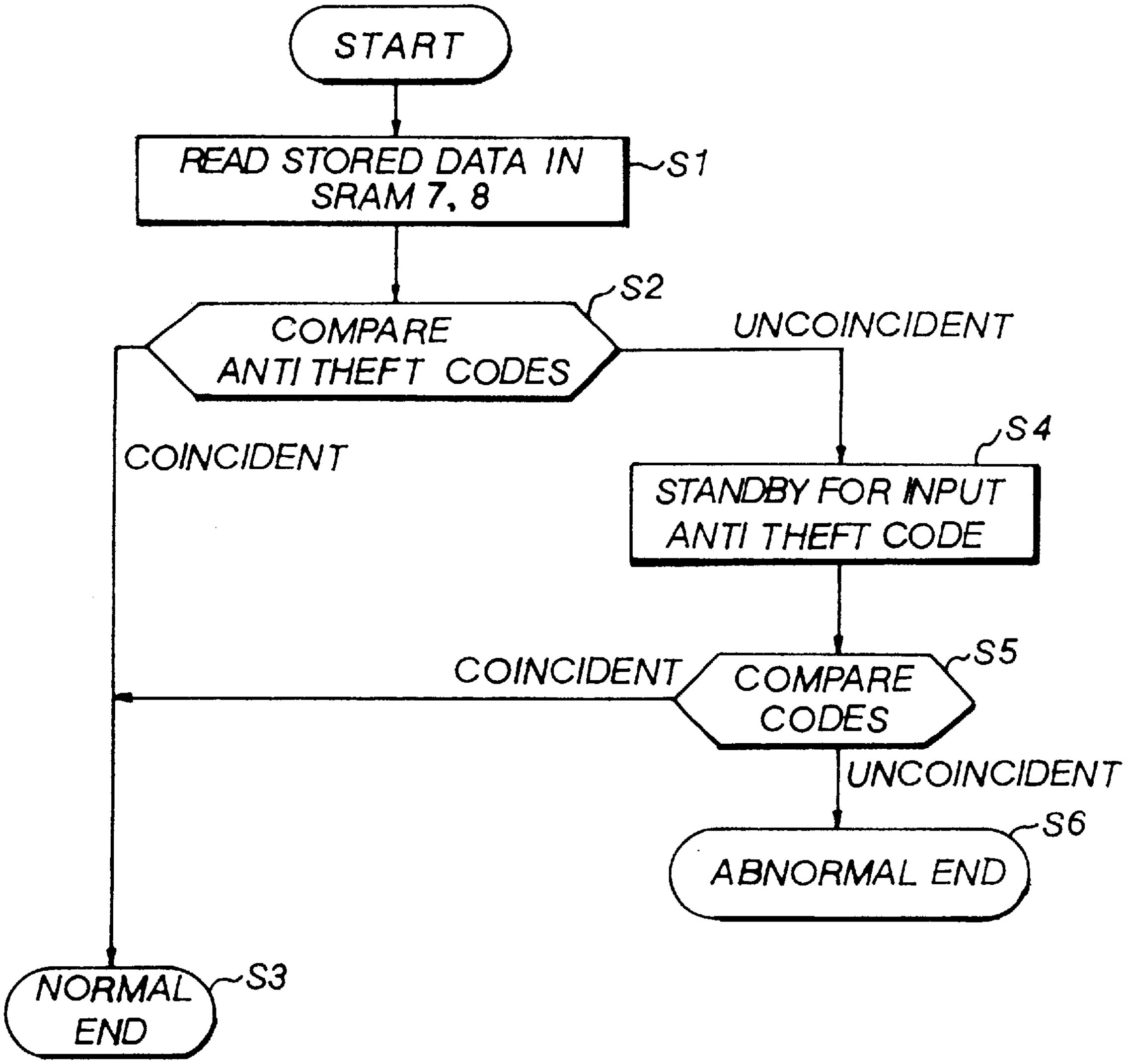
Fig. 5 PRIOR ART
FIG. 5 is a flow chart showing operation of a security function of the conventional vehicle navigation system.

FIG. 1 is a block diagram showing the present navigation system and is similar to FIG. 4 except for the absence of the first SRAM. A controller 30 is a microcomputer, and a GPS receiver 21 detects a present vehicle position and speed by satellite navigation. GPS receiver 21 conventionally receives radio signals from a plurality of GPS satellites orbiting the earth to detect a present position (latitude, longitude, altitude) of the GPS receiver.

A CD-ROM 22 stores map data composed of road layers, background layers, character and symbol layers for each contraction scale, etc. LCD monitor 23 (display unit) is controlled by the controller 30 to display a map at a present position of the vehicle, a guidance route from a departure point to a destination, a vehicle position mark, and other guidance information.

A gyro 24 senses a turning angle of the vehicle, and a speed pulse detector 25 senses a speed pulse that is generated in accordance with vehicle movement. The controller 30 employs data obtained from the GPS receiver 21, gyro 24, and speed pulse detector 25, and map data from the CD-ROM 22 to precisely detect a present position, a traveling direction, and a speed of the vehicle.

A user operation panel 26 operates the system. Operation panel 26 is, for example, a conventional transparent touch sensor attached to the front of the screen of the monitor 23.

SRAM 28 stores an anti-theft code, and a backup battery 29 backs up data stored in the SRAM 28. The navigation system is supplied with electric power from vehicle battery 27.

Figure 2:
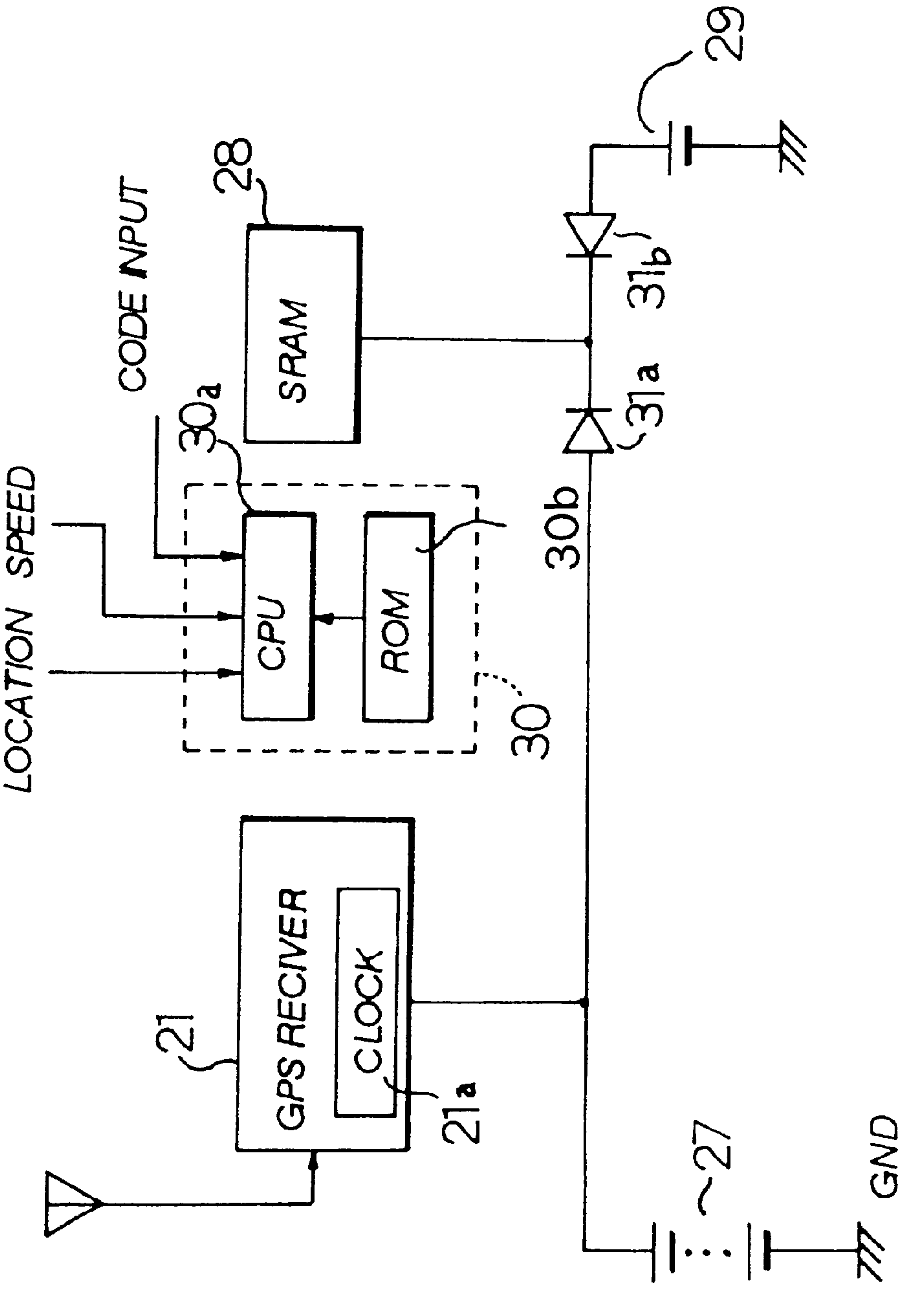
FIG. 2 is a detailed block diagram showing the security function of the present navigation system.

FIG. 2 is a detailed block diagram showing elements for carrying out the security function in the navigation system. The GPS receiver 21 is provided with a clock 21*a*. Clock 21*a* updates the time and is synchronized to the present time information transmitted from a GPS satellite. The GPS receiver 21 is powered by the vehicle battery 27, and even if the power switch of the navigation system is turned off, the clock 21*a* keeps operating. Further, the GPS receiver 21 is conventionally provided with a memory (not illustrated), which stores the position of the vehicle immediately before the power switch of the navigation system is turned off. This memory is powered by the vehicle battery 27. Thereby, the GPS receiver 21 can estimate the positions where the receiver can receive GPS satellite signals when the power switch of the navigation system is later turned on, thereby measuring the position of the vehicle quickly. Further, the clock 21*a* returns to an initial preset time (for example, AM, 00 hour, 00 minute, Nov. 1, 1994) when the power supply from the vehicle battery 27 is disconnected. When the vehicle battery is reconnected and the GPS receiver 21 receives GPS signals, the time of the clock 21*a* is updated to the present time by the present time information received from the GPS satellites.

A CPU (microcomputer 30*a*) is contained in the controller 30, and also a ROM (read only memory) in which programs for operation of the navigation system are stored. The ROM 30*b* stores the foregoing initial time (initial value) of the clock 21*a*.

The SRAM 28 is powered both by the vehicle battery 27 and the battery 29. A diode 31*a* is connected between the vehicle battery 27 and the SRAM 28 in order to prevent any electrical current from the battery 29 from flowing into the vehicle battery 27. A diode 31*b* is connected between the battery 29 and the SRAM 28 in order to prevent any electrical current from the vehicle battery 27 from flowing into the battery 29.

Figure 3:
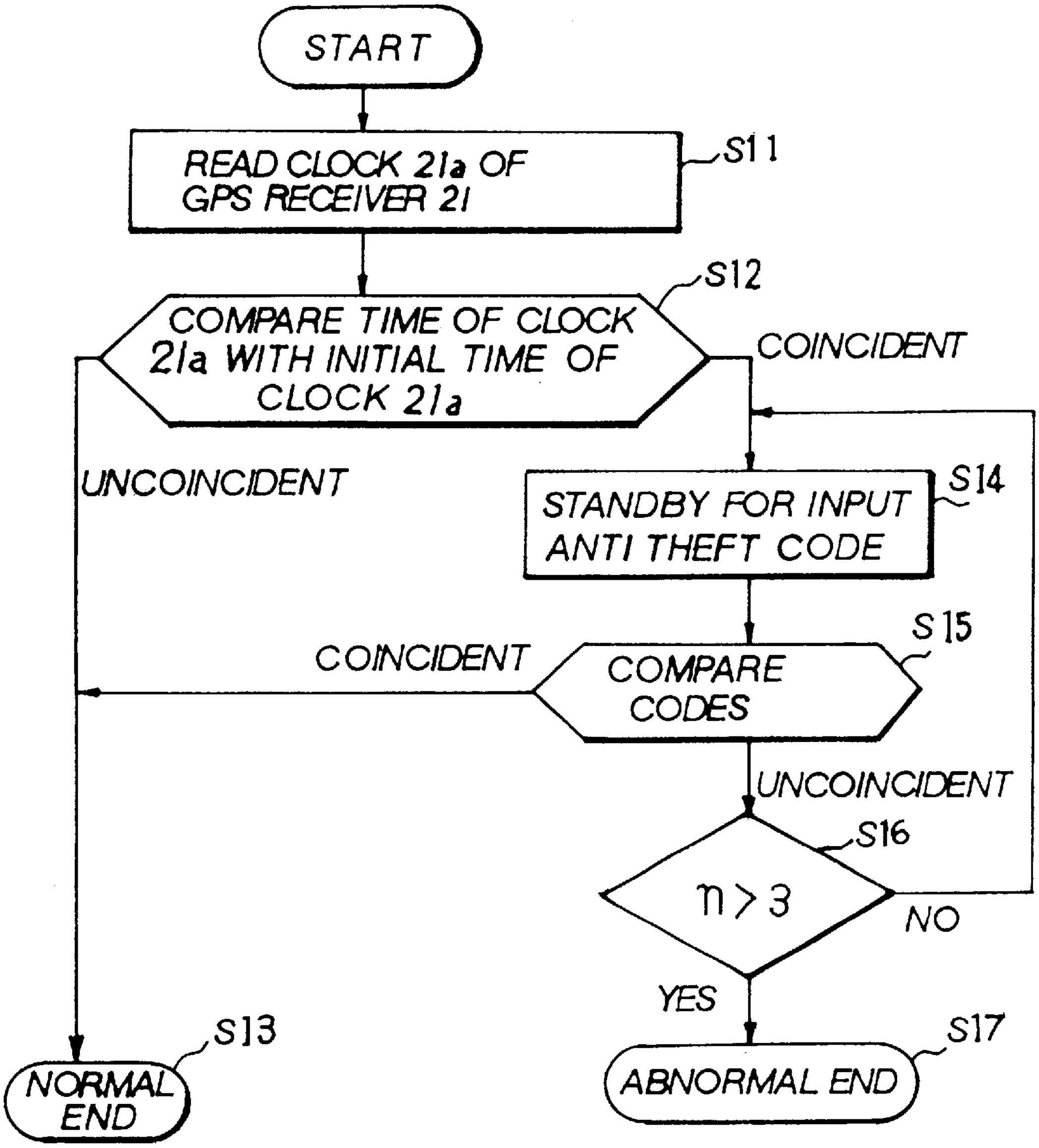
FIG. 3 is a flow chart showing operation of the security function of the present navigation system.

FIG. 3 is a flow chart showing operation of the present security function. Here, suppose that the SRAM 28 holds a specific anti-theft code (for example, a four digit password) preset by a user. First, when the power switch of the navigation system is switched on, the CPU 30*a* in the controller 30 reads out a time from the clock 21*a* of the GPS receiver 21, at step S11. Next, at step S12 the CPU 30*a* compares the time read out from the GPS receiver 21 to the initial time stored in the ROM 30*b*. Normally the GPS receiver 21 is powered by the vehicle battery 27, and the clock 21*a* in the GPS receiver 21 is always in operation. Accordingly, the time read out from the clock 21*a* does not match the initial time stored in the ROM 30*b*. In this case, at step S13, the navigation system normally terminates the security function. Thereafter, the navigation system operates normally to detect a present position the vehicle based on received GPS signals, searches a guidance route to a destination set by a user, and guides the vehicle to the destination along a guidance route.

On the other hand, when the navigation system is disconnected from the vehicle battery 27 and later reconnected to the battery 27, the clock 21*a* in the GPS receiver 21 returns to the initial present time. Accordingly, when the time read out from the GPS receiver 21 is compared to the initial time stored in the ROM 30*b* at step 21, the time from the GPS receiver 21 matches (is coincident with) the initial time stored in the ROM 30*b*; and the operation moves to step S14. The vehicle navigation system displays an image on the monitor 23 (a message to the user) requesting input of an anti-theft code.

Thereafter, when the user inputs a four digit number (anti-theft code) via the operation panel 26, at step S15 the CPU 30*a* compares the input anti-theft code to the anti-theft code stored in the SRAM 28. If these anti-theft codes match (are coincident) step S13, operation terminates normally.

If at step S15, the anti-theft code input via the operation panel 26 does not match the anti-theft code stored in the SRAM 28, operation moves to step S16, where the frequency (number of times) of the code input is checked. If the frequency of the code input does not exceed three, for example, operation returns to step S14.

On the other hand, if at step S16, the frequency of the code input exceeds three, operation moves to step S17, where the system abnormally terminates operation so the system operation remains frozen. That is, the navigation system stops its operation.

In this embodiment, when the navigation system is removed from the vehicle, and then later reconnected to the vehicle battery, the system requests the user to input the anti-theft code. If the input anti-theft code does not match the anti-theft code stored in the SRAM 28, the system goes into an abnormal termination and its operation remains frozen; thus the navigation system is put into a malfunction state. Thereby, anyone except the authorized owner cannot use the navigation system, which discourages theft thereof by making the system useless.

Further, in the present navigation system, whether the time of the clock 21*a* in the GPS receiver 21 has returned to the initial time (or not) is an indication whether (or not) the system has been removed from the vehicle, thereby reducing the number of the SRAMs required for achieving this security function. Thus, the present navigation system has reduced cost and reduced size.

Further, in the foregoing embodiment, the time read out from the GPS receiver 21 by the CPU 30*a* is compared to the initial time stored in the ROM 30*b*. However, when the time read out from the GPS receiver 21 has changed greatly, the system may require the anti-theft code to be input. In other words, when the GPS receiver 21 is removed from the vehicle and then later reconnected to a battery, the clock in the GPS receiver 21 starts clocking from the initial time. However, when the GPS receiver 21 receives a GPS signal, the present time information contained in the GPS signal updates the time of the clock 21*a* to be the present time. Therefore when the CPU 30*a* detects a substantial change in the time from the clock 21*a* (for example, change in time of day), the system may request input of the anti-theft code. Thus, the same theft deterrence effect as in the foregoing embodiment is achieved.

As described above, in the present navigation system a detection element (detector) detects whether or not the time of the clock incorporated in the GPS receiver has returned to the initial present time. When the time of the clock is detected to have returned to the initial time, a control element (controller) requests input of an identification code and compares the input identification code to an identification code stored in an identification code memory. When the two identification codes do not match, the system terminates operation, for example, its operation remains frozen, and the navigation system will not function. Thereby no one except the authorized owner is able to use the navigation system, which discourages theft.

Furthermore, in the present navigation system, by detecting whether or not the time of the clock incorporated in the GPS receiver has returned to its initial time, removal of the navigation system from the vehicle is detected. Therefore one memory (e.g., one memory location) suffices for storing the identification code for the security function. Thereby the present navigation system of the invention has reduced cost and size.

Embodiments of the invention being thus described, it will be understood by one skilled in the art that these embodiments may be varied in many ways. Such variations are not a departure from the spirit and scope of the invention, and all such modifications are intended to be included within the scope of the appended claims.

What is claimed is:

1. A vehicle navigation system having a security feature, comprising:

a receiver including a clock outputting a time synchronized to present, received time information, wherein the receiver is coupled to a battery of the vehicle and returns the time to a preset time when the receiver does not receive power from said battery;

a detector coupled to the clock which detects whether the time of said clock has returned to the preset time;

a nonvolatile memory which stores an identification code; and a controller coupled to said detector and which requests input of an identification code from a user of the system when said detector detects that the time of said clock has returned to the preset time, and which compares the input identification code to the identification code stored in said memory, wherein said controller puts the system into a normal state if the codes match.

2. A navigation system as in claim 1, further comprising a second memory which stores a specific time of said clock; and wherein said detector compares a time output from said clock to the specific time stored in said second memory, and thereby detects whether the time of said clock has returned to the specific time.

3. A navigation system as in claim 1, wherein said controller compares said input identification code to the identification code stored in said memory, and puts the system into an abnormal state if the codes do not match.

4. A navigation system as in claim 1, wherein said controller compares the input identification code to the identification code stored in said memory, and if the codes do not match, allows the identification code to be input repetitively, with a limit of a preset number of times, and if the codes do not thereafter yet match, puts the system into an abnormal state.

5. A navigation system as in claim 2, wherein said second memory is included in said controller.

6. A navigation system having a security feature, comprising:

a receiver including a clock outputting a time synchronized to present, received time information, wherein the receiver is coupled to a battery of the vehicle;

a detector coupled to the clock and which detects whether the time output from said clock has varied more than a specific time, thereby indicating that an abnormal security condition may have occurred;

a nonvolatile memory which stores a preset identification code;

a controller coupled to said detector and which requests input of an identification code from a user of the system when said detector detects that the time of said clock has varied more than said specific time, and compares the input identification code to the preset identification code stored in said memory, wherein said controller puts the system into a normal state if the codes match.

7. A navigation system as in claim 6, wherein said specific time is one of one year, one month, and one day.

8. A method of detecting an identification code in a vehicle navigation system having a security feature, comprising the steps of:

storing an identification code in a nonvolatile fashion;

detecting whether a time of a clock has returned to a specific time, wherein said clock outputs a time synchronized to present, received time information, and wherein the clock is coupled to a battery of said vehicle and returns the time to the specific time when the clock is not coupled to said battery;

inputting an identification code from a user of the system upon detection that the time of said clock has returned to the specific time;

comparing the input identification code to the stored identification code; and entering a normal processing state if the codes match.

9. A method as in claim 8, wherein the code is input repeatedly, with a limit of a specific number of times, if the codes do not initially match.

10. A method as in claim 8, wherein if the codes do not match entering a termination processing state.

11. A method of detecting an identification code in a vehicle navigation system having a security feature, comprising the steps of:

storing an identification code in a nonvolatile fashion;

detecting whether a time of a clock has varied more than a specific time to thereby indicate that an abnormal security condition may have occurred, wherein said clock is in a receiver and outputs a time synchronized with present, received time information while the receiver is coupled to a vehicle battery;

inputting an identification code from a user of the system when it is detected that the time of said clock has varied more than a specific time;

comparing the input identification code to the stored identification code; and entering a normal processing state if the codes match.

12. A method as in claim 11, wherein said specific time is one of one year, one month, and one day.

13. A vehicle navigation system having a security feature, comprising:

a receiver including a clock outputting a time synchronized to present, received time information, wherein the receiver is coupled to a battery of said vehicle and the clock returns the time to a specific time when the receiver is not coupled to said battery;

a detector coupled to said receiver and which detects whether the time of said clock has returned to the specific time;

a nonvolatile memory which stores a preset anti-theft code; and a controller coupled to said detector and which requests input of an anti-theft code from a user of the system when said detector detects that the time of said clock has returned to the specific time, and which compares the input anti-theft code to the stored anti-theft code and puts the system into a normal security state if the codes match.

14. A navigation system as in claim 13, further comprising:

a second memory which stores a specific time of said clock; and wherein said detector compares a time output from said clock to the specific time stored in said second memory, and thereby detects whether the time of said clock has returned to the specific time.

15. A navigation system as in claim 13, wherein said controller detects a present position of the vehicle from information received by said receiver.

16. A navigation system as in claim 13, further comprising a sensor coupled to the controller and providing information as to movement of the vehicle, wherein said controller determines a present position of the vehicle using both information received by said receiver and information from said sensor.

17. A navigation system as in claim 13, wherein said controller compares said input anti-theft code to said anti theft code stored in said memory, and if the codes do not match, puts the system in an abnormal security state.

* * * * *